(12) United States Patent
Baraff et al.

(10) Patent No.: US 6,657,629 B2
(45) Date of Patent: Dec. 2, 2003

(54) COLLISION FLYPAPERING: A METHOD FOR DEFINING REALISTIC BEHAVIOR FOR SIMULATED OBJECTS IN COMPUTER ANIMATION

(75) Inventors: David E. Baraff, Oakland, CA (US); Andrew Witkin, Oakland, CA (US)

(73) Assignee: Pixar Animation Studios, Emeryville, CA (US)

( * ) Notice: Subject to any disclaimer, the term of this patent is extended or adjusted under 35 U.S.C. 154(b) by 187 days.

(21) Appl. No.: 09/794,057

(22) Filed: Feb. 28, 2001

(65) Prior Publication Data

US 2002/0118197 A1 Aug. 29, 2002

(51) Int. Cl.[7] .......................... G06T 13/00; G06T 15/70
(52) U.S. Cl. ..................... 345/474; 345/958; 345/473
(58) Field of Search ................. 345/419, 473, 345/420, 474, 952, 953, 958, 619, 621, 645, 653, 655, 672; 703/1, 6–12

(56) References Cited

U.S. PATENT DOCUMENTS 5,912,675 A * 6/1999 Laperriere .................. 345/473
6,326,963 B1 * 12/2001 Meehan ...................... 345/419

OTHER PUBLICATIONS

Jeff Lander, Skin Them Bones: Game Programming for the Web Generation, May 1998, Game Developer (www.gdmag.com), pp. 11–16.*

Jeff Lander, Slashing Through Real–Time Character Animation, Apr. 1998, Game Developer (www.gdmag.com), pp. 13–16.*

T. Stoeger, J. Ramsey and D. Brinsmead, "*How to Create Long Hair With Maya Paint Effects and Maya Cloth*", Alias/Wavefront, Corporate Overview, 4 pages.

* cited by examiner

*Primary Examiner*—Mark Zimmerman
*Assistant Examiner*—Linzy McCartney
(74) *Attorney, Agent, or Firm*—Townsend and Townsend and Crew LLP

(57) ABSTRACT

A method and an apparatus allows animators to control the extent by which scripted character motions affect simulated objects' motions. The simulated objects are connected to the character or non-simulated object, such as clothing or hair, and the motion of the simulated objects is simulated based on the motion of the character or non-simulated object. Collision flypapering is employed to yield the proper behavior of simulated objects when those objects are pinched by surfaces of the character and/or other collision objects.

12 Claims, 4 Drawing Sheets

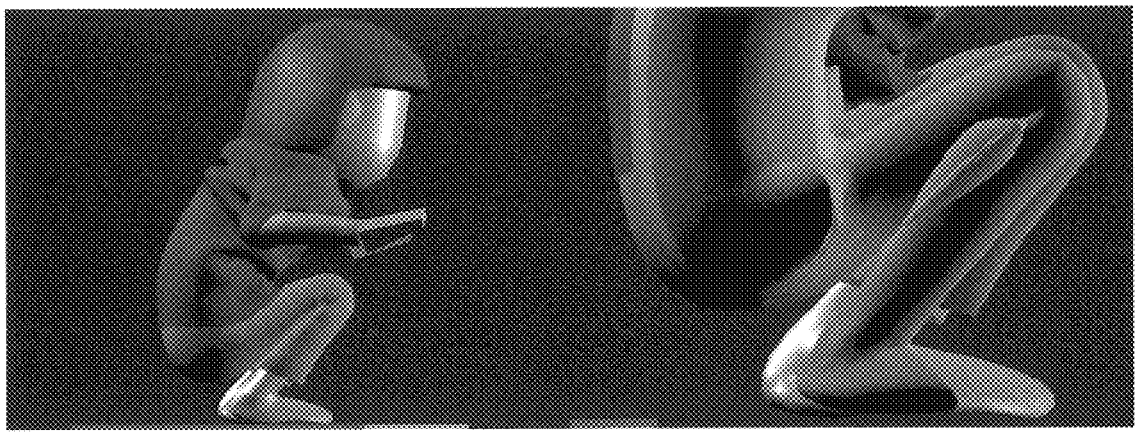
Fig. 2a                    Fig. 2b

COLLISION FLYPAPERING: A METHOD FOR DEFINING REALISTIC BEHAVIOR FOR SIMULATED OBJECTS IN COMPUTER ANIMATION

BACKGROUND OF THE INVENTION

1. Field of the Invention

The present invention relates generally to animation and more specifically to computer animation of characters and objects. The present invention is also directed to providing animators with greater control over aspects of simulated objects associated with a character to produce proper changes in those elements even when the simulated objects are "pinched" between non-simulated objects, such as, for example, elements of the character.

2. Description of the Related Art

Traditional animation techniques allow the animator to create the apparent motion of animated characters, to be viewed by a viewer of the animation. The use of computers to simplify the animation process has provided many benefits to the traditional hand-drawn process. Computer-animated characters are well known in the prior art and have been used in many different capacities. Such characters are utilized in traditional movies, videos and online streaming of moving pictures, as well as interactive movies where the motion of characters is often initiated by a user.

Often times in the animation of characters, the characters have "simulated objects or elements", such as clothing and hair, that are responsive to the main motion of the characters. The motions of some secondary or simulated elements in computer graphics imagery are often too complex for an animator to directly control. Instead of a human animator determining the motion of these simulated elements, computer programs use physically-based numerical methods that simulate the motion of these simulated elements (such as hair or cloth) over time.

This is accomplished by modeling the physical properties of these dynamic elements (how the cloth bends due to forces or collisions with solid objects, how the hair deforms or collides with itself, the external forces on these simulated objects (gravity, wind) and the motions of the non-simulated objects (for example, the characters that cloth rests on or that the hair grows out of). The animation of the non-simulated objects is provided by the animator and is independent of and unaffected by anything that the simulated objects do.

One of the hardest aspects of the computer simulation is making the simulated objects react appropriately to collisions with the non-simulated objects. A typical scenario is for an animator to animate the motions of a character, and then use a simulation to automatically produce motion for the character's clothing, for example. From the simulation program's viewpoint, the character's motion is predetermined; the simulation program's task is to make the clothing respond to collision and contact with the character as the character moves about.

Difficulties arise when the character's motion causes the simulated objects to become pinched between two or more surfaces of the character. Up until now, simulation programs have not been able to deal correctly with simulated objects caught in such pinch regions. Correcting the underlying animation so that it is free from physically unrealistic pinches is time-consuming for an animator, and often prohibitively expensive.

For example, FIG. 1a shows a character having simulated pants. As the character squats, as shown in FIGS. 1b and 1c, the simulated pants become pinched between regions near the character's knees. A closer look, shown in profile in FIG. 2, reveals that the character's legs actually intersect as she squats. This is shown most clearly in FIG. 2b. This pinching behavior raises a serious problem: where should simulated particles pinched between intersecting objects go?

Prior art methods have not been able to remedy the problems discussed above. For example, MAYACLOTH, from Alias|Wavefront, owned by SGI of Toronto, Canada, is a software implemented 3D cloth modeler for dressing and animating 3D characters. Clothing parameters are controllable by parameters which allow for garments composed of multiple fabrics and the garments can respond to wind, gravity and the underlying motion of the characters.

However, MAYACLOTH tries to resolve pinching by letting the user arbitrarily pick one surface to pay attention to and ignoring the other surfaces. The program's attempts to work around the problem of pinching does not work very well.

Thus, there is a need for a method that allows dynamically simulated objects to behave well in the presence of animation which "pinches" simulated objects such as cloth, hair or fur between non-simulated objects, such as characters and/or collision objects.

SUMMARY OF THE INVENTION

Accordingly, it is a principal object of the present invention to provide a method to allow an animator to control and define realistic behavior for simulated objects that become pinched in the manner described above. The method is called collision flypapering because it locks simulated particles in place when the particles become "pinched." The method applies to any simulated object that is describable as a collection of particles, connected to each other in some manner.

The present invention is directed to a method of simulating motion of objects in computer animation. That process includes providing a motion of a non-simulated object, where the non-simulated object is an element of a computer animation display and the non-simulated object has a spatial position and at least one surface. At least one simulated object is associated with the non-simulated object, where the motions and positions of the at least one simulated object are based on the motion and spatial position of the non-simulated object. When the at least one simulated object is pinched by at least one surface of the non-simulated object, the motions and positions of the at least one simulated object are selectively restrained. Finally, the elements of the computer animation are displayed, including the associated motions and positions of each elements.

The method selectively restrains the motion and position of simulated objects by determining body-space coordinates of partions of the simulated objects (with respect to each non-simulated pinching surface), and then using those body-space coordinates to choose a goal position (with respect to each non-simulated pinching surface).

In addition, the motions of portions of the simulated object can be based on a weighted sum of goal positions of portions of the simulated object, with each goal position being multiplied by one of a set of scalar weight values. The set of scalar weight values can have the same numerical value, have one particular scalar weight value set to a maximum numerical value, have non-uniform values such that portions of the simulated object track one of a multiplicity surfaces preferentially.

The method is applicable to when the non-simulated object is an animated character and the simulated elements are coupled to the animated character. Additionally, the simulated elements may represent hair or clothing attached to the animated character.

Also, the simulated objects may include a first set of simulated objects and a second set of simulated objects and the method may include selectively restraining the motions and positions of the simulated objects. Each set of simulated objects is manipulated with respect to separate reference points on the non-simulated object. In addition, the simulated objects may selectively restrained with reference to a plurality of reference points coupled to those simulated objects.

The above and other objects, features and advantages of the invention will become apparent from the following description of the preferred embodiment taken in conjunction with the accompanying drawings.

BRIEF DESCRIPTION OF THE DRAWINGS

FIG. 1a is an illustration of the character in a standing position. FIG. 1b presents the illustration of FIG. 1a when the character squats down and FIG. 1c presents the character fully crouched down.

FIGS. 2a and 2b are side views of FIG. 1c. FIG. 2a shows the profile side view and FIG. 2b shows a close-up cut-away view showing cloth flypapered between the legs of the animated character

DESCRIPTION OF THE PREFERRED EMBODIMENTS

The present invention is directed to a method for controlling the dynamic simulation of simulated objects pinched between non-simulated objects. In a preferred embodiment, the simulated objects are elements such as cloth, clothing, hair or fur associated with non-simulated objects, such as characters and/or collision objects.

Figure 3:
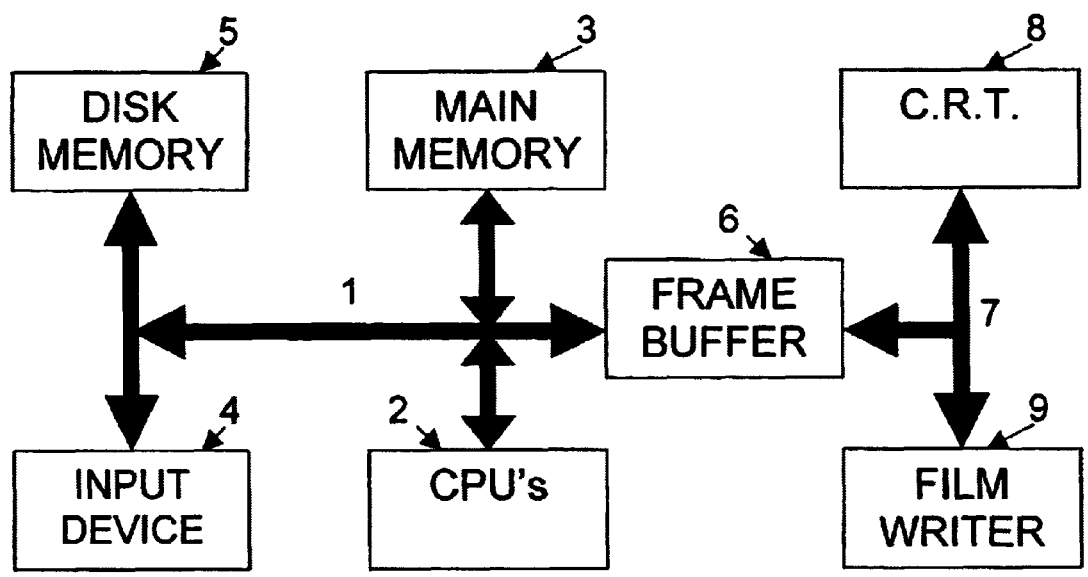
FIG. 3 is a schematic showing a computer system that can be used to create, store and record computer animation.

In the context of the present application, FIG. 3 illustrates a computer system for carrying out the invention. A main bus 1 is connected to one or more CPUs 2 and a main memory 3. Also, connected to the bus are an input device 4 and a disk memory 5. The frame buffer 6 receives output information from the main bus and sends it through another bus 7 to either a CRT 8 or some other peripheral that writes the image directly onto film 9. The computer system is used to simulate objects reacting to collisions with other objects.

The present invention applies to any simulated object that is describable as a collection of particles, connected to each other in some manner. For example, a topological mesh in the case of clothing, or perhaps as a collection of strands, to describe hair or fur. Collision flypapering lets the simulation program realistically handle collisions between the simulated particles and non-simulated objects that the particles encounter.

In particular, collision flypapering produces a good solution even when the non-simulated objects' motion are grossly implausible, as shown in FIG. 2b. As shown therein, there is a physically impossible intersection between the legs near the knees. The present invention produces a response resulting in the cloth neatly lying midway between the intersecting leg areas.

Figures 1A, 1B, 1C:
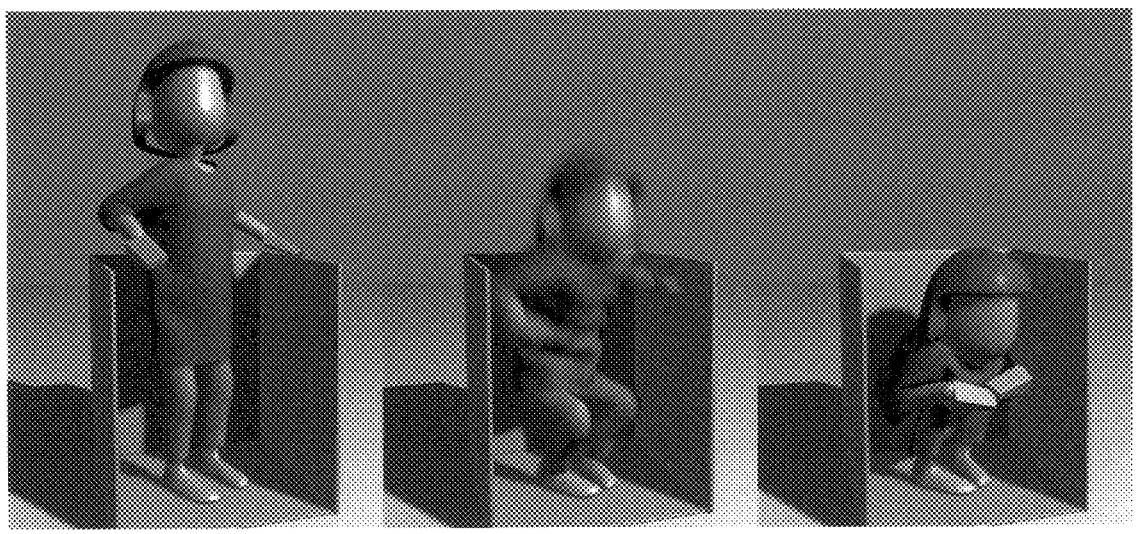
FIGS. 1a–1c illustrate an animated character.

A common component of all physically-based simulation systems is the imposition of constraints on the objects being simulated. In the present invention, the constraints are due to collisions. Specifically, the particles making up the simulated object need to be constrained when they collide with non-simulated objects. An example of this would be the cloth on the character, shown in FIG. 1b, as it collides with the young girl character.

However, the collision flypapering method is not concerned with the actual constraint enforcement mechanism employed by the simulator used by the animator. That is, the present invention does not restrict in any way how the simulator enforces constraints on the simulated particles. The position in space of a particle as a function of time is denoted by $p(t) \in \Re^3$. Given a simulated particle colliding with one or more non-simulated objects at some time $t_0$, the only assumption needed is to describe positions the particle is allowed to be in at future times $t_0 + \Delta t$, for some short duration of time $\Delta t$. It is the simulator's job to make sure that the particle moves so that its position $p(t_0 + \Delta t)$ at each time $t_0 + \Delta t$ is legal. Without requiring any particular representation, a non-simulated collision surface that a particle might collide with will simply be denoted as S.

When a particle collides with a collision surface S at time $t_0$, the particle's motion forward in time must be constrained. The constraint is that the particle position $p(t)$ must lie on or outside of S for $t > t_0$. The surfaces are oriented such that a surface S divides space into an "inside" and an "outside." The collision constraint allows the particle 2½ degrees of freedom; the particle can wander freely about the surface S (two degrees of freedom), or to "detach" and move away from the surface (another half-degree of freedom). Of course, while in contact with S, other influences (friction, attachments to other particles) may further proscribe the particle's freedoms. In FIG. 1, cloth particles on the girl's arms may remain on the arms, or they may move away from the arms; once they move some distance away from the arms, these particles remain unconstrained until they contact another collision surface. The only thing the particles may not do while in contact with the arms is to move inside the arms.

Before addressing the collision flypapering process, a somewhat different constraint between a simulated particle and an non-simulated surface is discussed below. The animator may wish to effectively "glue" a particle to a surface. In particular, it may be designated that once the particle was within some distance of S, the particle is to behave as if it was firmly stuck to S, neither sliding about on the surface, nor moving inward or outward relative to S. If such a constraint is imposed on the particle at some time to when it is near S, at future times the particle's motion is completely determined by the motion of S. The constraint removes three degrees of freedom from the particle, leaving the particle, which had only three degrees of freedom to begin with, with no degrees of freedom left. As S moves about, or deforms, the particle moves with a lock-step motion.

Mathematically, this is simply described. Only two concepts are needed: a body-space coordinate system for S, and a mapping function $W_S$ from the S body-space coordinates into world-space coordinates. The inverse function $W_S^{-1}$ takes points from world-space coordinates and maps them back to the S body-space coordinates.

An example of a body-space coordinate system for the Earth could be latitude, longitude and height-above-ground. As the Earth moves in space, the body-space coordinate can be converted to a point in space and vice versa. A point in space that maintains the same body-space coordinates over time as the Earth moves appears to be rigidly attached to the Earth. If the Earth were to deform significantly, one could imagine using similarly deformed lines of latitude and longitude to perform the mapping.

Given a body-space coordinate b, the point $W_S(b, t)$ is the world-space location corresponding to body coordinate b at time t. By definition, for any point p in world-space, and at any time, $$W_S(W_S^{-1}(p,t),t)=p. \quad (1)$$

A particle is glued onto S as follows. At time $t_0$, when the constraint is activated, the particle's current body-space coordinates b are computed as:

$$b=W_S^{-1}(p(t_0),t_0). \quad (2)$$

It is noted that b is a constant. It records where the particle was relative to S at time $t_0$ when the constraint was activated. The particle is now glued onto S by enforcing the constraint:

$$p(t)=W_S(b, t). \quad (3)$$

for times $t>t_0$.

A constraint that removes a half-degree of freedom from a particle works well when the particle collides with a single surface. When a particle contacts multiple surfaces however, and the simulator determines that the particle is "pinched" between the surfaces, such a constraint present difficulties.

Collision flypapering begins with the premise that a pinched particle is so tightly held in place by opposing contact surfaces that the particle has no degrees of freedom left. Accordingly, such particles are subject to a constraint that removes all of the particle's degrees of freedom. Collision flypapering operates on a particle whenever the particle is pinched by two or more surfaces. When the pinch goes away, the particle stops being flypapered. The simulator is responsible for deciding whether or not a particle should actually be flypapered. Collision flypapering is only responsible for the decision of how a particle should behave once the simulator decides is should be flypapered.

Of concern is the constrained location of the particle in space during flypapering. In the discussion above, the particle was glued to a surface through the use of body-space coordinates. The same approach is applied for the "unglued" particle. First it is assumed that particle is being flypapered due to pinching by surfaces $S_1$ through $S_n$ and that the flypapering begins at time $t_0$. The fixed body-space coordinates $b_1$ relative to each surface $S_1$ is defined by $$b_i=W_{S_i}^{-1}(p(t_0),t_0) \quad 4)$$

and "goal" positions for times $t>t_0$ by $$g_i(t)=W_{S_i}(b, t_0); \quad (5)$$

each goal position $g_i$ defines where the particle would go at time t if it was glued only to surface $S_i$.

The final component to collision flypapering is a choice of non-negative scalar weights $\alpha_i$ with the property $\alpha_1+\alpha_2+ \ldots +\alpha_n=1$; using these weights, a collision flypapered particle is constrained by requiring $$p(t)=\alpha_1 g_1(t)+\alpha_2 g_2(t)+ \ldots +\alpha_n g_n(t). \quad (6)$$

It is noted that when n=1, this becomes exactly the situation described above for particles with zero degrees of freedom. Additionally, it is noted that over any period of time that the surfaces all move with the exact same motion (i.e. if the velocities of all $g_i$ are equal), then p(t) assumes the same velocity as well. This assures that the particle remains simultaneously glued to all surfaces whenever it can. With respect to the above weighting, the simplest choice for the weights $\alpha_i$ is to choose to set each $\alpha_i$ to 1/n. For a particle pinched by two surfaces, $\alpha_1=\alpha_2=\frac{1}{2}$. This is the situation illustrated in FIG. 2b, where the pinched pants lie halfway between the intersecting upper and lower leg surfaces.

It is noted that the particle inherits half of its motion from each of the two surfaces; in particular, if one surface is motionless but the other moves, then the particle picks up only one-half of the motion of the moving surface. Thus, if the surfaces move to strongly intersect one another, as shown in FIG. 2b, the flypapered particles tend to stay roughly halfway between them, which is a good solution. Conversely, when the two surfaces move apart, the flypapered particles again stay between them. Once the two surfaces are sufficiently far apart, the flypapering on the particles stops.

Figure 4:
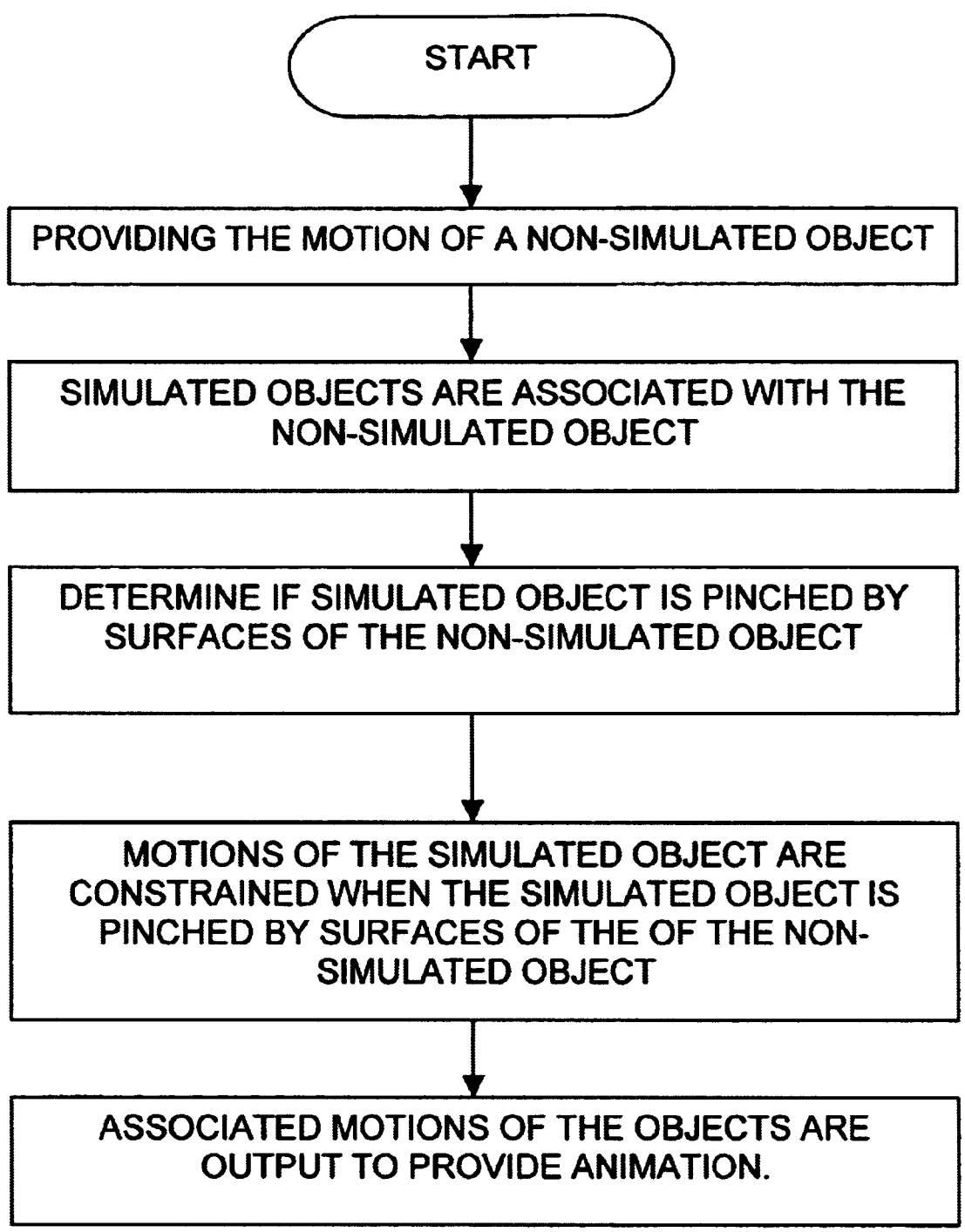
FIG. 4 is a flow chart illustrating the steps of one embodiment of the present invention.

A method according to one embodiment of the present invention is illustrated in a flow chart provided in FIG. 4. The method begins, in this example, when the animator provides motion to a non-simulated object, such as a character. Simulated objects, such a clothing or hair are then associated with the non-simulated object. The method then has a step of determining if the simulated object is pinched by surfaces of the non-simulated object. This is illustrated particularly in FIG. 2b. Once the pinching is established, the invention acts to constrain the motions and positions of the simulated object.

More subtle behavior results by choosing non-uniform values for the $\alpha_i$ weights. Taken to extreme, $\alpha_1$, can be set to 1 and all of the other $\alpha_i$ be set to zero. In this case, the particle will exactly track the motion of surface $S_1$, and will ignore the motion of the other surfaces. However, this behavior will only happen when the particle is flypapered. Such behavior might be useful when a character has pants and is skidding on the floor. If the animator wishes the pants to remained glued to the legs, but only when the pants are pinched between the legs and the floor, then weights are chosen so that the pants track exactly with the legs, while ignoring the floor. The reverse process, wherein the pants stick to the floor while the character slides out of them is typically not desirable.

In addition, non-uniform weights can be assigned so that particles closely track one collision surface, while being somewhat influenced by another. For a character rubbing her hands against her shirt and torso such that the cloth becomes pinched, the animator may wish for the cloth to stay 98% stuck to the torso and follow the hands at only a 2% value. Alternatively, if the animator wants the hand rubbing to appear more vigorous, the weight could be set so that the shirt follows the torso 90% ad the hands at 10%.

It is noted that the weighting values can vary from particle to particle. For example, if the character is wearing gloves, the gloves would want to track the fingers closely, and pay little attention to other parts of the body.

With respect to the above discussion, the collision flypapering of the present invention is implemented in software that is accessible by the animator. The software implementation of the present invention allows the animator simple access to the functionality of the present invention. Although the above discussion addresses the setting of specific scalar weights, the results can be simplified for the animator. For example, a software implementation may set the scalar weights based on simple choices or alternate criteria submitted to the animator when the animator wishes to invoke the collision flypapering of the present invention.

Collision flypapering allows for particles pinched between non-simulated surfaces to be handled in an extremely robust and simple manner. The use of weighting values $\alpha_i$ lends great sophistication to the method and allows for a variety of subtle motion effects. Collision flypapering is described independently of the underlying simulation system, and independently of the representation of the non-simulated objects and is thus is a widely applicable simulation technique.

Although embodiments of the present invention have been described in detail, it will be understood that the present invention is not limited to the above-described embodiments, and various modifications in design may be made without departing from the spirit and scope of the invention defined in claims.

What is claimed is:

1. A method of simulating relative motion of objects in computer animation comprising the steps of:

providing a motion of a non-simulated object, where the non-simulated object is an element of a computer animation display and the non-simulated object has spatial position and at least one surface;

providing at least one simulated object associated with said non-simulated object, where said at least one simulated object is another element of the computer animation display and where motions and position of said at least one simulated object are based on the motion and spatial position of the non-simulated object;

selectively restraining the motions and positions of said at least one simulated object in response to a pinching of said at least one simulated object by said at least one surface of the non-simulated object; and displaying the elements of the computer animation display, including associated motions and positions of said elements.

2. A method of simulating relative motion of objects according to claim 1 wherein said step of selectively restraining the motions and positions of said at least one simulated object comprises determining body-space coordinates of said at least one simulated object and motions in said body-space coordinates based on goal positions of portions of said at least one simulated object.

3. A method of simulating relative motion of objects according to claim 2 wherein said body-space coordinates of said at least one simulated object and motions in said body-space coordinates are based on a weighted sum of goal positions of portions of said at least one simulated object, with each goal position being multiplied by one of a set of scalar weight values.

4. A method of simulating relative motion of objects according to claim 3 wherein in said selectively restraining step each of the set of scalar weight values has the same numerical value.

5. A method of simulating relative motion of objects according to claim 3 wherein one scalar weight value of the set of scalar weight values has a maximum numerical value and the remaining scalar weight values of the set of scalar weight values has a minimum numerical value.

6. A method of simulating relative motion of objects according to claim 3 wherein in said selectively restraining step said at least one surface of said non-simulated object is multiple surfaces and the numerical values of each of the set of scalar weight values is non-uniform such that portions of said at least one simulated object track one of said multiple surfaces preferentially.

7. A method of simulating relative motion of objects according to claim 1 wherein in said step of providing a motion of a non-simulated object said non-simulated object is an animated character and said at least one simulated object is associated with the animated character.

8. A method of simulating relative motion of objects according to claim 5 wherein in said step of providing at least one simulated object said at least one simulated object comprises a representation of hair attached to the animated character.

9. A method of simulating relative motion of objects according to claim 5 wherein in said step of providing at least one simulated object said at least one simulated object comprises a representation of clothing attached to the animated character.

10. A method of simulating relative motion of objects according to claim 1 wherein said at least one simulated object comprises a first set of simulated objects and a second set of simulated objects and said step of selectively restraining the motions and positions of said at least one simulated object comprises selectively restraining the motions and position of said first set of simulated objects with respect to a first reference point on said non-simulated object and selectively restraining the motions and position of said second set of simulated objects with respect to a second reference point on said non-simulated object.

11. A method of simulating relative motion of objects according to claim 1 wherein said at least one simulated object comprises a plurality of simulated objects coupled to a plurality of reference points on said non-simulated object and wherein step of selectively restraining the motions and positions of said at least one simulated object comprises selectively restraining the motions and positions of each of said plurality of simulated objects with respect to said plurality of reference points coupled thereto.

12. A method of simulating relative motion of objects according to claim 11 wherein in said selectively restraining step said non-simulated object comprises an animated character and said plurality of simulated objects are coupled to the animated character and said plurality of reference points are different points on the animated character.

* * * * *